United States Patent
Wu (10) Patent No.: US 10,873,985 B2
(45) Date of Patent: *Dec. 22, 2020

(54) DEVICE AND METHOD OF HANDLING A DUAL CONNECTIVITY WITH BASE STATIONS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 33 days.

This patent is subject to a terminal disclaimer.

(21) Appl. No.: 16/274,179

(22) Filed: Feb. 12, 2019

(65) Prior Publication Data

US 2019/0254096 A1 Aug. 15, 2019

Related U.S. Application Data

(60) Provisional application No. 62/630,262, filed on Feb. 14, 2018.

(51) Int. Cl.
*H04W 76/15* (2018.01)
*H04W 76/34* (2018.01)
(Continued)

(52) U.S. Cl.
CPC ........... *H04W 76/15* (2018.02); *H04W 24/10* (2013.01); *H04W 36/0027* (2013.01);
(Continued)

(58) Field of Classification Search
None
See application file for complete search history.

(56) References Cited

U.S. PATENT DOCUMENTS 10,462,695 B2 * 10/2019 Wu ............... H04W 76/15
2011/0021154 A1 1/2011 Marinier
(Continued)

FOREIGN PATENT DOCUMENTS

EP 2 934 057 A1 10/2015
EP 2 945 423 A1 11/2015

OTHER PUBLICATIONS

3GPP, "3rd Generation Partnership Project; Technical Specification Group Radio Access Network NR Radio Resource Control (RRC) protocol specification (Release 15)", 3GPP Ts 38.331 V15.0.0 (Dec. 2017), pp. 1-188.
(Continued)

*Primary Examiner* — Jay L Vogel
(74) *Attorney, Agent, or Firm* — Winston Hsu (57) ABSTRACT

A communication device for handling a DC with a first BS and a second BS comprises at least one storage device storing instructions of configuring a first signalling radio bearer (SRB) for communicating with the first BS; receiving a first measurement configuration on the first SRB; transmitting a first measurement report associated to the first measurement configuration; receiving a first radio resource control (RRC) message on the first SRB, wherein the first RRC message configures the second BS as a secondary node (SN); configuring a second SRB for communicating with the second BS; receiving a second measurement configuration on the second SRB; transmitting a second measurement report associated to the second measurement configuration; disconnecting from the second BS; releasing at least one of the second measurement configuration, a measurement result associated to the SN and the second SRB; and maintaining a data radio bearer configuration.

12 Claims, 4 Drawing Sheets

(51) Int. Cl.
  *H04W 36/00* (2009.01)
  *H04W 24/10* (2009.01)
  *H04W 76/27* (2018.01)
  *H04W 76/30* (2018.01)
  *H04W 36/30* (2009.01)

(52) U.S. Cl.
  CPC ... *H04W 36/0069* (2018.08); *H04W 36/0088* (2013.01); *H04W 36/0094* (2013.01); *H04W 36/305* (2018.08); *H04W 76/27* (2018.02); *H04W 76/34* (2018.02)

(56) References Cited

U.S. PATENT DOCUMENTS

| | | | | |
|---|---|---|---|---|
| 2015/0334767 | A1* | 11/2015 | Chien | H04W 36/08 370/217 |
| 2015/0350962 | A1* | 12/2015 | Futaki | H04W 76/15 370/331 |
| 2016/0183151 | A1* | 6/2016 | Wu | H04W 76/15 370/332 |
| 2016/0212662 | A1 | 7/2016 | Lee | |
| 2016/0338039 | A1* | 11/2016 | Van Der Velde | H04W 76/10 |
| 2016/0353512 | A1* | 12/2016 | Lu | H04W 76/19 |
| 2018/0352600 | A1* | 12/2018 | Wu | H04W 76/34 |
| 2020/0022215 | A1* | 1/2020 | Takahashi | H04W 76/19 |
| 2020/0059985 | A1* | 2/2020 | Henttonen | H04W 76/11 |

OTHER PUBLICATIONS

Office action dated Feb. 27, 2020 for the Taiwan application No. 108104932, filing date Feb. 14, 2019, p. 1-12.
3GPP TSG-RAN WG2 Meeting #98 R2-1704659, May 2017.
3GPP TSG-RAN WG2 Meeting #98 R2-1705415, May 2017.
3GPP TS 36.413 V15.0.0, Dec. 2017.
3GPP TS 36.300 V15.0.0, Dec. 2017.
3GPP TS 37.340 V15.0.0, Dec. 2017.
Search Report dated Jul. 12, 2019 for EP application No. 19157176.9, pp. 1-6.
Nokia Siemens Networks, Nokia Corporation, "Measurements for Carrier Aggregation", 3GPP TSG-RAN WG2 Meeting #73, R2-110921, Feb. 21-25, 2011, Taipei, Taiwan, XP050493648, pp. 1-3.
Intel Corporation, "Details on S-RLF", 3GPP TSG-RAN WG2#86, R2-142031, May 19-23, 2014, Seoul, Korea, XP050818322, pp. 1-3.
NSN, Nokia Corporation, "SeNB Failure Reporting", 3GPP TSG-RAN WG2 Meeting #86, R2-142310, May 19-23, 2014, Seoul, Korea, XP050818434, pp. 1-8.
NSN, Nokia Corporation, "RRM measurements for Dual Connectivity", 3GPP TSG-RAN WG2 Meeting #86, R2-142317, May 19-23, 2014, Seoul, Korea, XP050818438, pp. 1-9.

* cited by examiner

DEVICE AND METHOD OF HANDLING A DUAL CONNECTIVITY WITH BASE STATIONS

CROSS REFERENCE TO RELATED APPLICATIONS

This application claims the benefit of U.S. Provisional Application No. 62/630,262, filed on Feb. 14, 2018, which is incorporated herein by reference.

BACKGROUND OF THE INVENTION

1. Field of the Invention

The present invention relates to a device and a method used in a wireless communication system, and more particularly, to a device and a method of handling a dual connectivity with base stations.

2. Description of the Prior Art

A UE may simultaneously connect to two base stations of which one is in a master node (MN) and the other is in a secondary node (SN). The UE is configured to utilise radio resources provided by the MN and SN.

SUMMARY OF THE INVENTION

The present invention therefore provides a communication device and method for handling a dual connectivity (DC) with base stations (BSs) to solve the abovementioned problem.

A communication device for handling a DC with a first BS and a second BS comprises at least one storage device and at least one processing circuit coupled to the at least one storage device. The at least one storage device stores instructions, and the at least one processing circuit is configured to execute the instructions of configuring a first signalling radio bearer (SRB) for communicating a first plurality of radio resource control (RRC) messages with the first BS; receiving a first measurement configuration on the first SRB from the first BS; transmitting a first measurement report associated to the first measurement configuration, on the first SRB to the first BS; receiving a first RRC message on the first SRB from the first BS, wherein the first RRC message configures the second BS as a secondary node (SN) such that the communication device is in the DC with the first BS and the second BS; configuring a second SRB for communicating a second plurality of RRC messages with the second BS in the DC; receiving a second measurement configuration on the second SRB from the second BS in the DC; transmitting a second measurement report associated to the second measurement configuration on the second SRB to the second BS in the DC; disconnecting from the second BS; releasing at least one of the second measurement configuration, a measurement result associated to the SN and the second SRB, in response to the disconnection; and maintaining a data radio bearer (DRB) configuration in response to the disconnection, wherein the DRB configuration configures a master cell group (MCG) bearer, a secondary cell group (SCG) bearer or a split bearer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
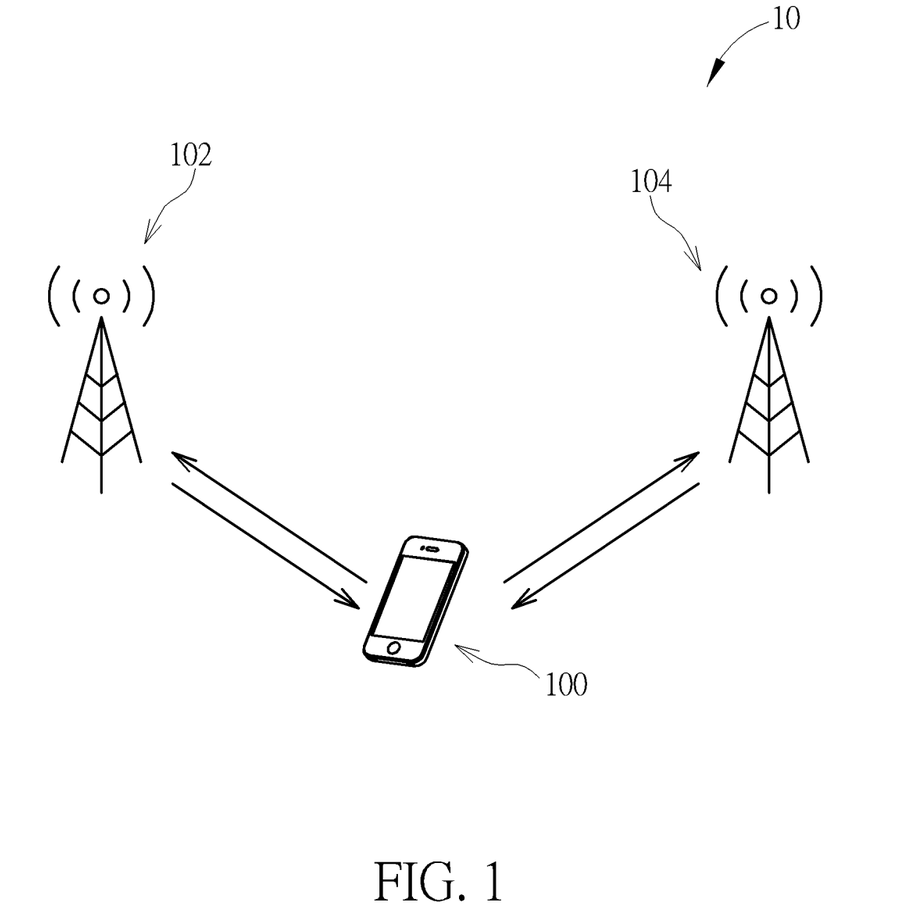
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10. In FIG. 1, coverage areas of the BSs 102 and 104 may be partly overlapped.

In FIG. 1, the communication device 100 may be configured to communicate with the BSs 102 and 104 at the same time according to a dual connectivity (DC) configured to the communication device 100. That is, the communication device 100 may perform a transmission/reception via both the BSs 102 and 104, e.g., at different carrier frequencies. The communication device 100 receives the packets from at least one cell of the BS 102 at one carrier frequency and/or at least one cell of the BS 104 at another carrier frequency. Similarly, the communication device 100 transmits the packets to at least one cell of the BS 102 at one carrier frequency and/or at least one cell of the BS 104 at another carrier frequency. One of the BSs 102 and 104 may be a master node (MN), and the other BS may be a secondary node (SN). One of the cell(s) of the MN communicating with the communication device 100 may be a primary cell (PCell), and the other cell(s) (if available) of the MN may be secondary cell(s) (SCell(s)). One of the cell(s) of the SN communicating with the communication device 100 may be a primary SCell (PSCell), and the other cell(s) (if available) of the SN may be SCell(s).

The communication device 100 connects to the MN and has a first signalling radio bearer (SRB), and the MN transmits a measurement configuration on the first SRB to the communication device 100. In details, the communication device 100 transmits a measurement report on the first SRB to the MN in response to the measurement configuration. The MN initiates a SN Addition procedure with the SN for the communication device 100 in response to the measurement report. The MN configures the communication device 100 to connect to the SN in response to the SN Addition procedure by transmitting a radio resource control (RRC) message on the first SRB to the communication device 100. The RRC message includes SN configuration(s) for the communication device 100 to connect to the SN. In response to the RRC message, the communication device 100 may setup a second SRB. The SN may transmit a second measurement configuration on the second SRB to the communication device 100, while the communication device 100 is in the DC with the MN and the SN. The communication device 100 transmits a second measurement report to the SN on the second SRB in response to the second measurement configuration.

The communication device 100 may be a user equipment (UE), a mobile phone, a laptop, a tablet computer, an electronic book, a portable computer system, a vehicle, a ship or an aircraft. In addition, the BS 102 or 104 and the communication device 100 can be seen as a transmitter or a receiver according to direction (i.e., transmission direction), e.g., for an uplink (UL), the communication device 100 is the transmitter and the BS 102 or 104 is the receiver, and for a downlink (DL), the BS 102 or 104 is the transmitter and the communication device 100 is the receiver.

Figure 2:
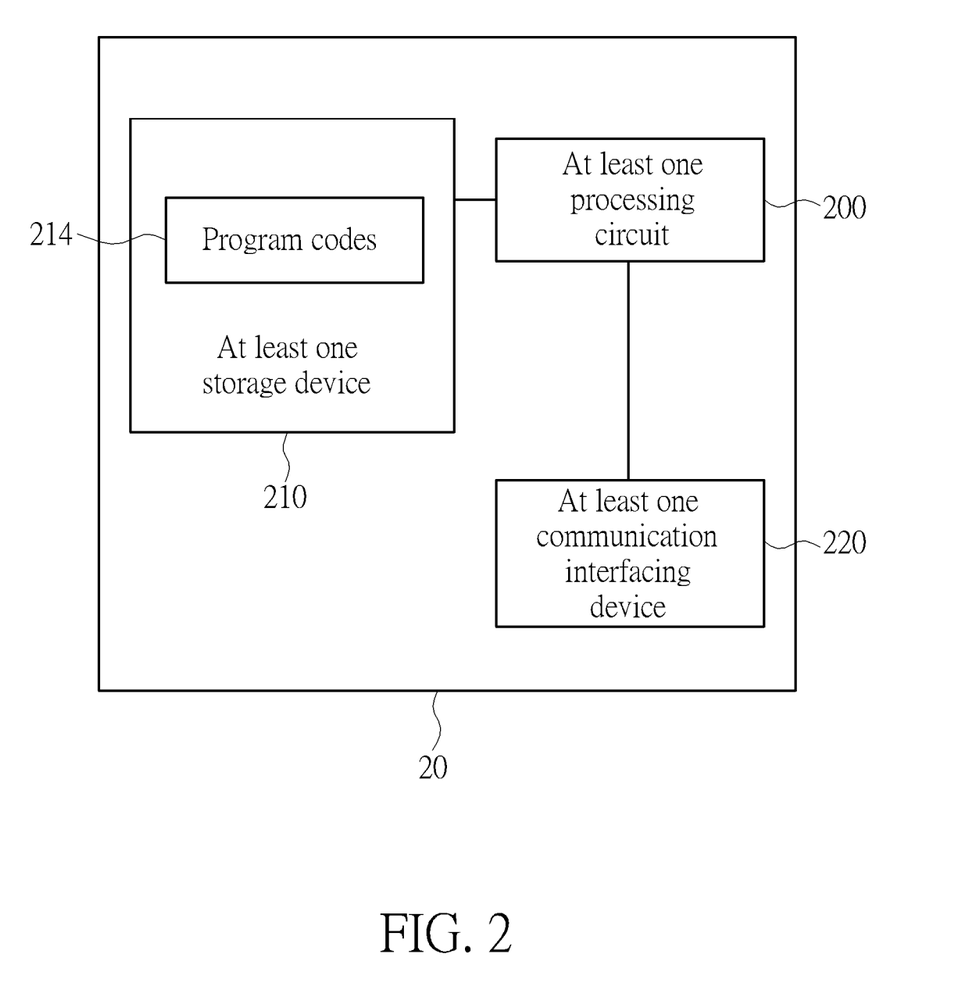
FIG. 2 is a schematic diagram of a communication device according to an example of the present invention.

FIG. 2 is a schematic diagram of a communication device 20 according to an example of the present invention. The communication device 20 may be the communication device 100 or the BS 102 or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the embodiments.

Figure 3:
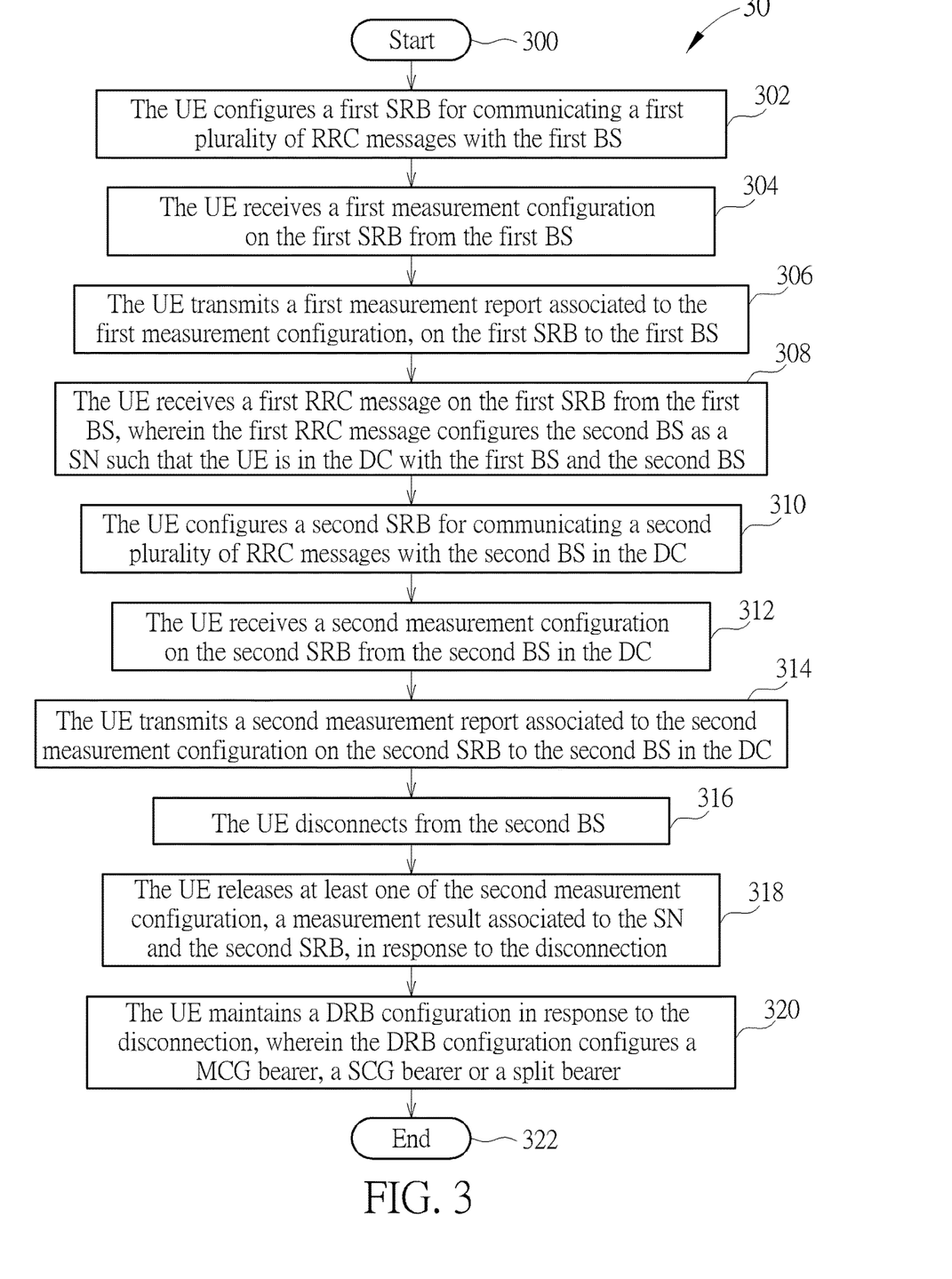
FIG. 3 is a flowchart of a process according to an example of the present invention.

A process 30 in FIG. 3 is utilized in a UE for handling a DC with a first BS (e.g., the BS 102) and a second BS (e.g., the BS 104), and includes the following steps:

Step 300: Start.

Step 302: The UE configures a first SRB for communicating a first plurality of RRC messages with the first BS.

Step 304: The UE receives a first measurement configuration on the first SRB from the first BS.

Step 306: The UE transmits a first measurement report associated to the first measurement configuration, on the first SRB to the first BS.

Step 308: The UE receives a first RRC message on the first SRB from the first BS, wherein the first RRC message configures the second BS as a SN such that the UE is in the DC with the first BS and the second BS.

Step 310: The UE configures a second SRB for communicating a second plurality of RRC messages with the second BS in the DC.

Step 312: The UE receives a second measurement configuration on the second SRB from the second BS in the DC.

Step 314: The UE transmits a second measurement report associated to the second measurement configuration on the second SRB to the second BS in the DC.

Step 316: The UE disconnects from the second BS.

Step 318: The UE releases at least one of the second measurement configuration, a measurement result associated to the SN and the second SRB, in response to the disconnection.

Step 320: The UE maintains a data radio bearer (DRB) configuration in response to the disconnection, wherein the DRB configuration configures a master cell group (MCG) bearer, a secondary cell group (SCG) bearer or a split bearer.

Step 322: End.

Figure 4:
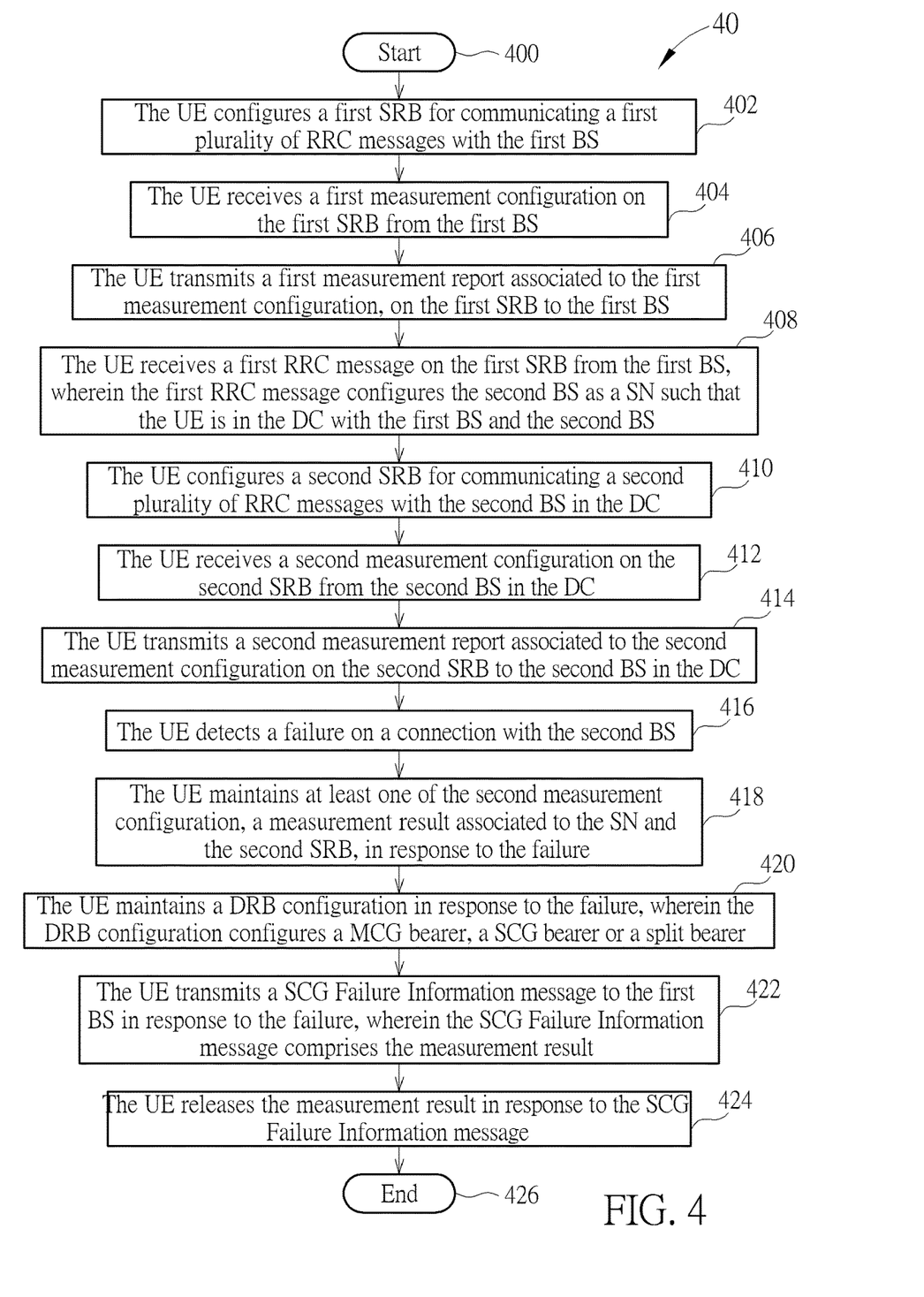
FIG. 4 is a flowchart of a process according to an example of the present invention.

A process 40 in FIG. 4 is utilized in a UE for handling a DC with a first BS (e.g., the BS 102) and a second BS (e.g., the BS 104), and includes the following steps:

Step 400: Start.

Steps 402-414: Same as Steps 302-314.

Step 416: The UE detects a failure on a connection with the second BS.

Step 418: The UE maintains at least one of the second measurement configuration, a measurement result associated to the SN and the second SRB, in response to the failure.

Step 420: The UE maintains a DRB configuration in response to the failure, wherein the DRB configuration configures a MCG bearer, a SCG bearer or a split bearer.

Step 422: The UE transmits a SCG Failure Information message to the first BS in response to the failure, wherein the SCG Failure Information message comprises the measurement result.

Step 424: The UE releases the measurement result in response to the SCG Failure Information message.

Step 426: End.

The following examples may be applied to any of the processes 30-40.

In one example, when releasing the measurement result in Step 424 and Step 318, the UE clears the measurement result stored in the UE or determines that the measurement result is not (e.g., no longer) valid. Thus, the UE does not transmit or use the measurement result, after releasing the measurement result.

In one example, the UE releases at least one of or all of the second SRB, a measurement gap configuration and a SCG configuration (or called SN configuration) in response to the disconnection from the second BS. The second BS may transmit the measurement gap configuration to the UE on the second SRB. The measurement gap configuration may be associated to/included in the second measurement configuration. The second BS may transmit the SCG configuration to the UE via the first BS. The SCG configuration may include at least one of a physical layer configuration, a medium access control (MAC) configuration, a radio link control (RLC) configuration and a logical channel configuration. The UE may receive the DRB configuration and the SCG configuration in the first RRC message or in a RRC message different from the first RRC message on the first SRB. The UE may transmit a RRC response message to the first BS on the first SRB in response to the RRC message.

In one example, the UE maintains (or keeps) at least one of or all of the second SRB, the measurement gap configuration and the SCG configuration in response to the failure on the connection with the second BS.

In one example, the UE receives a second RRC message (e.g., RRCConnectionReconfiguration or RRCReconfiguration) on the first SRB from the first BS in the DC. The UE disconnects from the second BS in response to the second RRC message. In one example, the second RRC message configures the UE to disconnect from the second BS.

In one example, the UE detects a failure (e.g., MCG failure) on a connection with the first BS and disconnects from the second BS in response to the failure. In one example, the failure is a radio link failure, a transmission failure, an integrity check failure or a reconfiguration failure. That is, the UE release the DC in response to the failure.

In one example, the UE does not transmit (e.g., stops transmitting) a measurement report to the first BS according to the second measurement configuration, since the second measurement configuration is not (e.g., no longer) valid.

In one example, when the UE is configured again in the DC with the first BS and the second BS or a BS different from the second BS and is configured the second SRB, the UE initializes or reinitializes variable(s) (to an initial value, e.g., 0), timer(s) and/or counter(s) of Packet Data Convergence Protocol (PDCP)/RLC entities of the second SRB. For example, one of the variable(s) indicates a sequence number of a PDCP/RLC Service Data Unit (SDU) or a PDCP/RLC PDU to be transmitted. One of the variable(s) indicates a sequence number of a PDCP/RLC SDU or a PDCP/RLC PDU to be received. The UE releases the measurement result associated to the SN and stored in the UE, in order not to transmit the measurement result to a BS (e.g., the first BS, the second BS or the BS different from the second BS). Thus, releasing the measurement result prevents the UE from transmitting the measurement result to the BS, since the measurement result may be obsolete. In addition, releasing the measurement result prevents the UE from transmitting a measurement report due to a trigger from the measurement result.

In one example, the UE gets the measurement result associated to the SN according to measurements configured by the second measurement configuration. That is, the measurement result is associated to the measurement configuration configured by the second BS.

In one example, unless the second RRC message explicitly indicates to release the DRB configuration, the UE maintains (or keeps) the DRB configuration in response to the second RRC message. In one example, the second RRC message reconfigures the DRB configured by the DRB configuration to be a MCG bearer. In one example, the second RRC message reconfigures the DRB to be a MCG split bearer from the SCG bearer or the split bearer. In this case, a SCG part of the split bearer is null (i.e., not configured).

In one example, the UE maintains (or keeps) the first measurement configuration in response to the second RRC message or the failure. That is, the UE may determine to maintain a measurement configuration depending on the measurement configuration configured by the first BS or the second BS.

In one example, the UE maintains (or keeps) the second measurement configuration in response to the failure on the connection with the second BS, i.e., a SCG failure. The UE may maintain the measurement result in response to the failure. In one example, the failure is a radio link failure, a transmission failure, an integrity check failure or a reconfiguration failure. That is, the UE may determine to release the measurement result or not according to a failure which is a MCG failure or a SCG failure. In one example, the UE releases the measurement result when transmitting the measurement result to the first BS, e.g., in the SCG Failure Information message, after detecting the SCG failure. In one example, the UE releases the measurement result, when including the measurement result in the SCG Failure Information message.

In one example, the first SRB is a MCG bearer or a split bearer, and the second SRB is a SCG bearer or a split bearer. In one example, the first SRB is SRB 1, and the second SRB is SRB 3.

In one example, both of the first measurement configuration and the second measurement configuration configure the UE to measure a first carrier (i.e., the same carrier). For example, the first measurement configuration and the second measurement configuration includes/indicates a first channel number (i.e., the same channel number) indicating the first carrier. For example, the first channel number may be an Absolute Radio Frequency Channel Number (ARFCN) or a Global Synchronization Channel Number (GSCN).

In one example, the first measurement configuration configures the UE to measure a first carrier, and the second measurement configuration configures the UE to measure a second carrier different from the first carrier. For example, the first measurement configuration includes/indicates a first channel number, and the second measurement configuration includes/indicates a second channel number different from the first channel number.

In one example, the measurement configuration above configures a reporting configuration specifying a reporting criterion (e.g., periodic reporting or an event type).

In one example, the first RRC message (e.g., RRCConnectionReconfiguration or RRCReconfiguration) is generated by the first BS or the second BS. The UE transmits the first RRC response message (e.g., RRCConnectionReconfigurationComplete or RRCReconfigurationComplete) on the first SRB to the first BS or to the second BS via the first BS on the first SRB, in response to the first RRC message.

In one example, the first BS generates the first RRC message, and transmits the first RRC message to the UE. The UE transmits the first RRC response message on the first SRB to the first BS.

In one example, the second BS generates the first RRC message and forwards the first RRC message to the first BS. The first BS encapsulates the first RRC message in a third RRC message (e.g., RRCConnectionReconfiguration or RRCReconfiguration) and transmits the RRC message to the UE on the first SRB. The UE transmits a third RRC response message (e.g., RRCConnectionReconfigurationComplete or RRCReconfigurationComplete) on the first SRB to the first BS, in response to the RRC message. The RRC response message may or may not include the first RRC response message. In case that the first RRC response message is included in the RRC response message, the first BS may forward the first RRC response to the second BS.

In one example, the second measurement configuration is generated by the second BS. In one example, the second measurement configuration is included in a fourth RRC message (e.g., RRCConnectionReconfiguration or RRCReconfiguration) generated by the second BS, and is transmitted by the second BS on the second SRB to the UE while the UE is in the DC with the first BS and the second BS. In response to the fourth RRC message, the UE may transmit a fourth RRC response message (e.g., RRCConnectionReconfigurationComplete or RRCReconfigurationComplete) on the second SRB to the second BS.

In one example, the first measurement configuration is generated by the first BS. The first measurement configuration may be included in a fifth RRC message (e.g., RRCConnectionReconfiguration or RRCReconfiguration) which is generated and transmitted to the UE by the first BS on the first SRB. The UE may transmit a fifth RRC response message (e.g., RRCConnectionReconfigurationComplete or RRCReconfigurationComplete) on the first SRB to the first BS in response to the fifth RRC message. In one example, the first measurement configuration is received by the first BS and by the UE from a third BS. The first BS implicitly configures the first measurement configuration to the UE by making the UE keep using the first measurement configuration in a handover command.

In one example, the first BS is an eNB, the second BS is a gNB, and the third BS is a gNB. In one example, the first BS is a gNB, the second BS is an eNB, and the third BS is an eNB. In one example, the first BS, and the second BS and the third BS are gNBs.

In one example, the UE sets up the first SRB in response to a RRC connection establishment procedure. In one example, the UE performs the RRC connection establishment procedure by transmitting a RRCConnectionRequest message to a BS (e.g., the first BS, the third BS or a fourth BS). The BS transmits a RRCConnectionSetup message configuring the first SRB to the UE in response to the RRCConnectionRequest message.

In one example, the UE sets up the second SRB in response to the first RRC message. That is, the first RRC message configures the second SRB.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling a DC with a first BS and a second BS. Thus, the second BS (e.g., Secondary eNB, Secondary gNB or SN) may receive a measurement result(s) from the communication device directly, and may take an action immediately according to the measurement result(s). As a result, the performance of the mobility management and the radio resource management for the communication device are improved for the second BS.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a dual connectivity (DC) with a first base station (BS) and a second BS, comprising:
   at least one storage device; and
   at least one processing circuit, coupled to the at least one storage device, wherein the at least one storage device stores, and the at least one processing circuit is configured to execute instructions of:
   configuring a first signalling radio bearer (SRB) for communicating a first plurality of radio resource control (RRC) messages with the first BS;
   receiving a first measurement configuration on the first SRB from the first BS;
   transmitting a first measurement report associated to the first measurement configuration, on the first SRB to the first BS;
   receiving a first RRC message on the first SRB from the first BS, wherein the first RRC message configures the second BS as a secondary node (SN) such that the communication device is in the DC with the first BS and the second BS;
   configuring a second SRB for communicating a second plurality of RRC messages with the second BS in the DC;
   receiving a second measurement configuration on the second SRB from the second BS in the DC;
   transmitting a second measurement report associated to the second measurement configuration on the second SRB to the second BS in the DC;
   detecting a failure on a connection with the second BS;
   maintaining the second measurement configuration and the second SRB, in response to the failure;
   maintaining a data radio bearer (DRB) configuration in response to the failure, wherein the DRB configuration configures a secondary cell group (SCG) bearer or a split bearer;
   transmitting a SCG Failure Information message to the first BS in response to the failure, wherein the SCG Failure Information message comprises a measurement result; and
   releasing the measurement result in response to the SCG Failure Information message.

2. The communication device of claim 1, wherein the communication device maintains at least one of a measurement gap configuration and a SCG configuration in response to the failure.

3. The communication device of claim 1, wherein the failure is a radio link failure, a transmission failure, an integrity check failure or a reconfiguration failure.

4. The communication device of claim 1, wherein the instructions further comprise:
   maintaining the first measurement configuration in response to the failure.

5. The communication device of claim 1, wherein the first measurement configuration configures the communication device to measure a first carrier, and the second measurement configuration configures the communication device to measure a second carrier.

6. The communication device of claim 1, wherein the instructions further comprise:
   transmitting a first RRC response message to the first BS on the first SRB or to the second BS via the first BS on the first SRB, in response to the first RRC message.

7. A method for handling a dual connectivity (DC) with a first base station (BS) and a second BS of a communication device, comprising:
   configuring a first signalling radio bearer (SRB) for communicating a first plurality of radio resource control (RRC) messages with the first BS;
   receiving a first measurement configuration on the first SRB from the first BS;
   transmitting a first measurement report associated to the first measurement configuration, on the first SRB to the first BS;
   receiving a first RRC message on the first SRB from the first BS, wherein the first RRC message configures the second BS as a secondary node (SN) such that the communication device is in the DC with the first BS and the second BS;
   configuring a second SRB for communicating a second plurality of RRC messages with the second BS in the DC;

receiving a second measurement configuration on the second SRB from the second BS in the DC;

transmitting a second measurement report associated to the second measurement configuration on the second SRB to the second BS in the DC;

detecting a failure on a connection with the second BS;

maintaining the second measurement configuration and the second SRB, in response to the failure;

maintaining a data radio bearer (DRB) configuration in response to the failure, wherein the DRB configuration configures a secondary cell group (SCG) bearer or a split bearer;

transmitting a SCG Failure Information message to the first BS in response to the failure, wherein the SCG Failure Information message comprises a measurement result; and releasing the measurement result in response to the SCG Failure Information message.

8. The method of claim 7, wherein the communication device maintains at least one of a measurement gap configuration and a SCG configuration in response to the failure.

9. The method of claim 7, wherein the failure is a radio link failure, a transmission failure, an integrity check failure or a reconfiguration failure.

10. The method of claim 7, further comprising:
maintaining the first measurement configuration in response to the failure.

11. The method of claim 7, wherein the first measurement configuration configures the communication device to measure a first carrier, and the second measurement configuration configures the communication device to measure a second carrier.

12. The method of claim 7, further comprising:
transmitting a first RRC response message to the first BS on the first SRB or to the second BS via the first BS on the first SRB, in response to the first RRC message.

* * * * *